Dec. 3, 1968  C. R. SCHAFER  3,413,844

JET ENGINE THRUST INDICATOR

Filed April 23, 1965  2 Sheets-Sheet 1

Inventor
Curtiss R. Schafer
By
George R. Clark
Atty

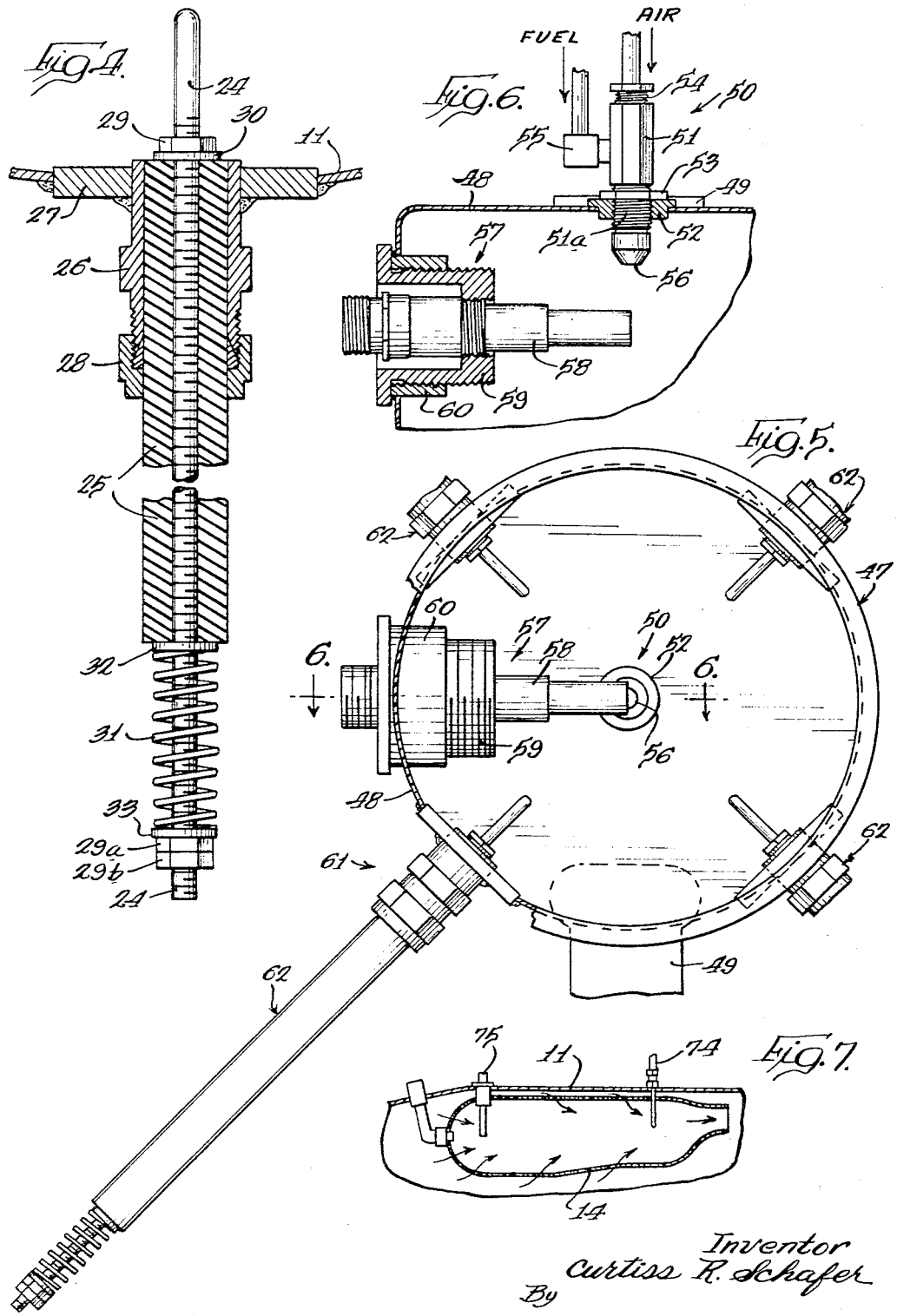

United States Patent Office 3,413,844
Patented Dec. 3, 1968

3,413,844
JET ENGINE THRUST INDICATOR
Curtiss R. Schafer, Newtown, Conn., assignor to Sunbeam
Corporation, Chicago, Ill., a corporation of Illinois
Filed Apr. 23, 1965, Ser. No. 450,342
15 Claims. (Cl. 73—117.4)

ABSTRACT OF THE DISCLOSURE

A meter for measuring the thrust produced by jet engines which meter is responsive to the ion content of the engine exhaust gases. The ion content measurement is compared with a standard measurement obtained from the ion content of the gas products of burned engine fuel in order to provide the thrust indication.

---

This invention relates to an apparatus for directly and accurately measuring the total thrust delivered by a jet engine.

Since the development of the jet engine, a need has existed for a practical system to measure directly the total thrust delivered by the engine while a craft is in flight or motion. Prior systems for accomplishing this result have been unsatisfactory either because they are far too complex to permit accurate inflight measurements or because they have failed to take into account important variables or parameters which seriously affect the thrust measurements being made. For example, devices are known in the art which utilize various measurements of pressure and temperature in a jet engine to provide an indication of thrust. U.S. Patent No. 3,019,604, for example, discloses a device for measuring the temperatures at the engine and turbine-outlets and the pressure at the engine inlet. These measured quantities are used in conjunction with the atmospheric pressure to compute the thrust produced by the engine. The empirical nature of the computation and the complexity of the system make it impractical for use in providing accurate thrust measurements.

It is well known that the thrust of a turbojet engine is directly proportional to the product of the mass and velocity of the exit or exhaust gases. The number of ions collected by a charged electrode disposed in a flowing hydrocarbon flame is also proportional to the mass and velocity of the gases. Thus, an indication of thrust may be achieved by measuring the ion current flow from one or more electrodes disposed in the flow of exhaust gases from a jet engine.

Mass spectrometric data shows that the predominant ion in hydrocarbon-air flames is $H_3O+$, a positive ion, although other ions are present in low concentrations. One of the problems in utilizing an ion measurement to provide thrust indication involves the variation in the number of ions produced as a result of differences in the makeup or constituency of the fuel consumed by the engine. The fuels used in modern jet aircraft vary considerably in their composition and makeup particularly with respect to the nature and minor amounts of impurities present. For example, potassium and sodium salts or other impurities of this character present in the fuel result in the production of a greater number of ions in the exhaust gases than would otherwise be the case. Even minor variations in the salt or other content of the fuels cause a considerable variation in the ion content of the exhaust gases. For this reason, the measurement of the ion concentration in the exhaust gases does not, by itself, provide an accurate indication of the thrust developed by a turbojet engine.

The primary object of the present invention is to provide apparatus for measuring the ion content of the exhaust gases produced by a turbojet engine more accurately than has heretofore been possible in order to provide an accurate indication of the thrust produced by the engine.

Another object of the invention is to provide apparatus for accurately measuring the ion content of the exhaust gases produced by a turbojet engine by compensating for variations in the constituents making up the fuel consumed by the engine.

A further object of the invention is to provide apparatus for measuring the ion content of the exhaust gases produced by a turbojet engine which apparatus includes means for determining the number of ions produced by burning a portion of the engine fuel in order to establish a standard for comparison with the ion concentration of the exhaust gases, thereby to provide an accurate measurement of the thrust produced by the engine.

The invention has for a further object the provisions of new and improved apparatus for measuring the thrust produced by a turbojet engine, which apparatus is simple and utilizes only a relatively small number of parts so that it can be constructed inexpensively and will be of relatively small weight and size.

The invention has for another object the provision of an apparatus for measuring the thrust of a jet engine, which apparatus is characterized by simplicity of design and construction to provide highly reliable operation over a very long life.

In accordance with the present invention, the foregoing and other objects are realized by providing an apparatus for measuring the ion content of the exhaust gases produced by a turbojet engine. This apparatus comprises one or more electrode arrays located at the exhaust or outlet end of the engine and responsive to the exhaust gases to develop an electrical current proportional to the product of the mass and velocity of the ions in the latter gases. Additional means are provided for measuring the ion content of a flame produced by the engine fuel in order to provide a reference current or voltage proportional to the ion concentration in the fuel including the ions produced by any impurities present. The current or voltage representing the ion concentration in the exhaust gases is then utilized in combination with the reference current or voltage to provide an indication accurately representing the thrust developed by the turbojet engine.

The invention, both as to its organization and manner of operation, together with further objects and advantages, will best be understood by reference to the following detailed description taken in conjunction with the accompanying drawings wherein:

FIG. 4 is an enlarged, fragmentary, sectional view showing one of the electrodes used in the measuring systems of FIGS. 1, 2 and 3;

FIG. 5 is an end view of the auxiliary combustion chamber illustrated in FIGS. 1 and 3 with a portion of the housing or shell broken away to show certain details of construction of the unit used for burning a sample of engine fuel in order to provide a reference signal for the measuring system;

FIG. 6 is an enlarged, sectional view taken along a line substantially corresponding to the line 6—6 in FIG. 5; and FIG. 7 is a fragmentary view showing a portion of the combustion chamber of a turbojet engine with an electrode arrangement responsive to a flame produced by the engine fuel for developing an ion current or voltage which, in turn, is utilized to provide a reference signal like the one referred to above.

Figure 1:
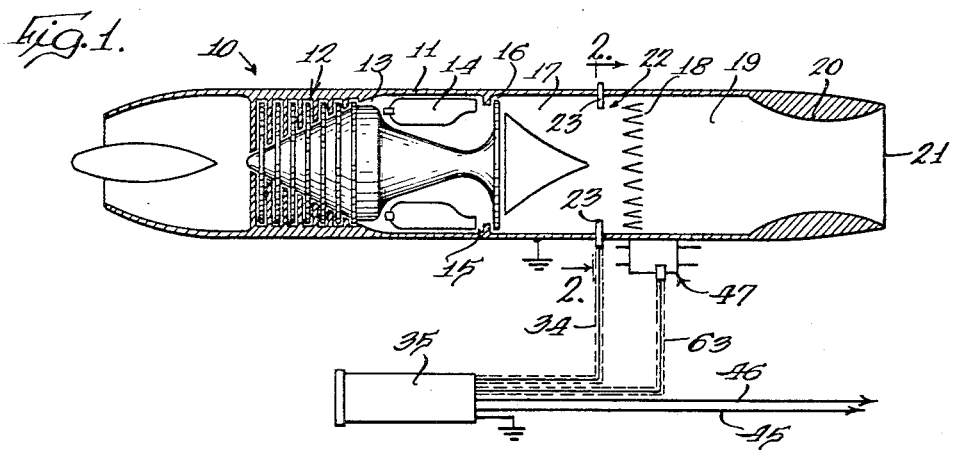
FIG. 1 illustrates somewhat schematically a longitudinal cross-sectional view taken through a typical jet engine and illustrating a thrust measuring system characterized by the features of the present invention.

Referring now to the drawings and first to FIG. 1, a turbojet engine identified generally by the reference numberal 10 is there shown in somewhat schematic form as comprising a housing or casing 11 containing a compressor 12 of conventional construction having its outlet 13 connected to deliver compressed gases to a combustion chamber 14 where the gases are heated and expanded for delivery to a turbine inlet 15. The outlet 16 of the turbine is connected to a tailpipe inlet 17 located upstream from a conventional afterburner 18. Gases from the tailpipe flow through a tailpipe outlet 19 located downstream from the afterburner and through a throat 20 to a jet nozzle outlet 21.

In the form of the invention shown in FIG. 1 an electrode array indicated generally by the reference numeral 22 and including a plurality of separate, uniformly spaced sampling electrode assemblies 23 is provided in the tailpipe inlet section for developing a current proportional to the ion concentration in the exhaust gases from the jet engine 10. The electrode assemblies 23 are preferably of identical construction and, as is best shown in FIG. 4, each comprises a probe or electrode 24 extending through an insulating sleeve 25. The probe 24 and its insulating sleeve 25 may be subjected to extremely high temperatures (in excess of 1200° C.) in the tailpipe inlet section of the jet engine. To overcome the adverse effects of these high temperatures, the probe 24 is preferably formed of conducting materials such as molybdenum, tantalum, tungsten-rhenium, tungsten-tantalum, or other high temperature alloys such as Chromel–AA, which is a tradename of Hoskins Mfg. Co. for a high temperature nickel-chromium alloy. The insulating sleeve 25 surrounding the probe is preferably made of insulating materials such as beryllium oxide capable of withstanding high temperature. The insulating sleeve 25 may also be made of boron nitride.

To mount each electrode assembly 23 on the wall or casing 11 of the engine, the insulating sleeve 25 of that assembly is inserted into a bushing 26 welded or otherwise secured to an annular mounting plate 27 which is, in turn, welded around its outer periphery to the casing or housing 11. The outer end of the bushing 26 is externally threaded to receive a split ring fitting 28 of the locking type which, when tightened onto the bushing, firmly grasps the periphery of the insulating sleeve 25 to hold the sleeve in position. The axial position of the electrode assembly may, of course, be adjusted by loosening the fitting 28 to permit the sleeve 25 to slide into or out of the bushing 26 until the extreme inner end of the probe 24 is located in the desired position whereupon the fitting 28 may again be tightened.

The probe or electrode 24 of each assembly is held in position by a plurality of spaced apart nuts. One of these nuts 29 is seated against a washer 30 disposed adjacent the inner end of the sleeve 25. A coil spring 31 encircles the outer end of the electrode 24 and is disposed between a first washer 32 seated against the outer end of the sleeve 25 and a second washer 33 seated against a nut 29a which is locked in position by a lock nut 29b. The spring 31 urges the probe outwardly until the nut 29 seats against the washer 30 to form a stop. The inner end of each probe 24 extends well beyond the wall or housing 11 of the engine so that the probe is disposed well within the stream of combustion gases, thereby avoiding the adverse effects of boundary conditions while at the same time exposing the probe to a representative portion of the exhaust gas stream. To achieve these results it is desirable that the inner end of the probe or electrode extend at least one inch or more beyond the wall of the engine 11.

Figure 2:
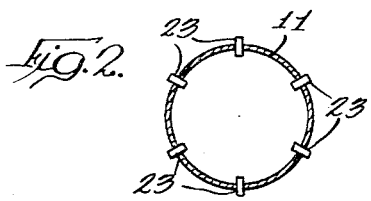
FIG. 2 is a sectional view taken along a line substantially corresponding to the line 2—2 in FIG. 1, assuming that the latter shows the entire engine construction, and shows an electrode array utilized in the measuring system of FIG. 1.

The number of electrodes in the array 22 is sufficient to average out the effects of turbulence in the stream of exhaust gases. Thus, while six electrodes are illustrated in FIG. 2 a greater or lesser number may be required to achieve satisfactory results in a particular engine. The pattern of turbulence remains fairly static for any given engine speed but this pattern changes considerably with variations in velocity of the gases in the exhaust stream. The probes 23 are preferably disposed to overcome any difficulties arising from such variations. Thus, while the probes have been illustrated in FIGS. 1, 2, 3 and 4 as being mounted in a position extending radially of the jet engine they could be oriented in a non-radial position to obtain better results in a given engine. The probes of the electrode assemblies are electrically connected in parallel so that their combined output is proportional to the sum of the ionization currents produced by the electrodes.

Figure 3:
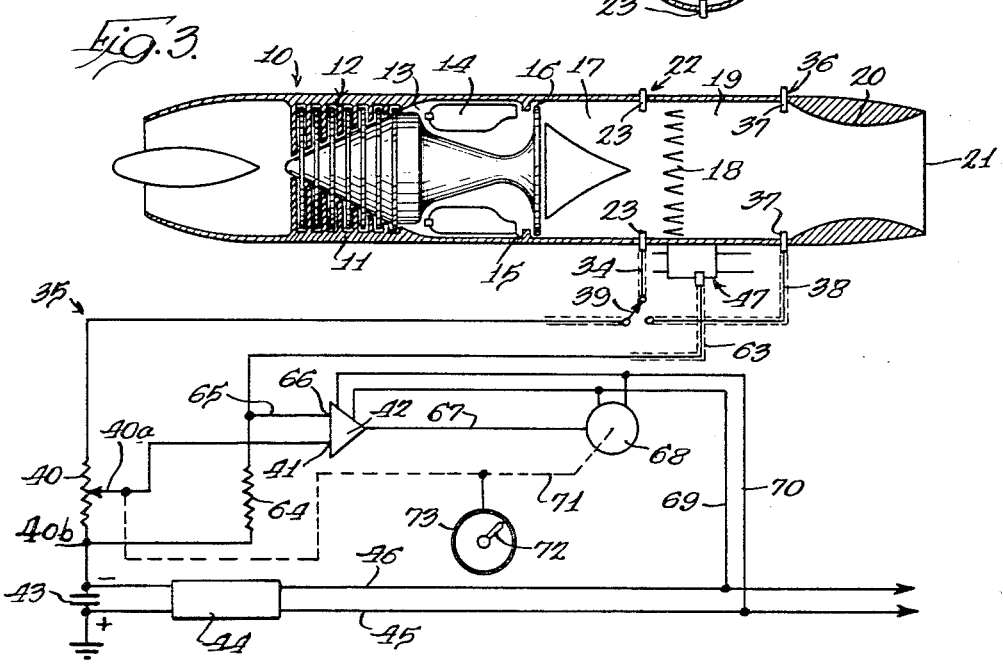
FIG. 3 is a view somewhat similar to FIG. 1 but shows a second embodiment of the thrust measuring system of the present invention with the components of the measuring system being shown schematically.

The parallel connected electrode assemblies 23 are, in turn, electrically connected through conductor means 34 to a thrust indicator 35 which is shown in block form in FIG. 1 but is illustrated schematically in some detail in FIG. 3 where corresponding reference numerals have been employed to indicate identical components in the two embodiments. The only difference between the arrangement shown in FIG. 1 and that shown in FIG. 3 is that the latter includes a second electrode array 36 comprising a plurality of spaced apart electrode assemblies 37 similar to the electrode assemblies 23 described above. The electrodes of the array 36 are also connected in parallel and are electrically connected through conductor means 38 to the thrust indicator 35. The electrode array 36 is mounted in the tailpipe outlet section 19 downstream of the afterburner 18. A manually operated switch 39 is provided within the thrust indicator 35 to transfer the operation from the electrode array 22 to the electrode array 36. Thus, with the switch in the position shown in FIG. 3 the thrust indicator provides measurements of the ion concentration in the exhaust gases in the inlet tailpipe section 17 or, more specifically, in the exhaust gases produced by the turbojet engine 10 without the afterburner operation. When the switch 39 is manually thrown to the other position, the electrode array 36 supplies ion currunt to the thrust indicator 35 so that the latter provides an indication of the ion concentration in the exhaust gases in the outlet tail section or, more specifically, in the exhaust gases produced by the turbojet engine operating with the afterburner. Thus, the switch 39, in effect, permits operation of the thrust indicator both with and without the afterburner in operation. The afterburners are normally used during only a small percentage of the operating time of the jet engine and, hence, it is preferable to provide for measurement of the ion concentration of the gas stream in the tailpipe inlet section 17 during those periods when the afterburner is not being utilized.

Turning to the thrust indicator 35 and referring particularly to FIG. 3, it will be observed that the circuit there shown is a self-balancing potentiometer circuit. The ion current passed by the switch 39 in either of its two positions is applied to a rebalancing precision potentiometer 40 to develop a voltage between a wiper 40a and terminal 40b for application to one input terminal 41 of a conventional servo amplifier 42. A capacitor 43, which is connected between one end of the potentiometer 40 and ground, is also connected across the output terminals of a 400 volt DC power supply 44. The latter power supply is energized by a suitable AC source such as a 400 cycle, 125 volt potential supplied via conductors 45 and 46. The power supply 44 is of conventional construction and develops an output which is applied either to the electrodes 23 or the electrodes 37 depending upon the position of the switch 39. The power supply includes a subminiature transformer, a pair of diodes forming a full wave rectifier and a conventional circuit but these components are not illustrated since they are well known in the art. The gases in the tailpipe section generally include a plurality of hydrocarbon-air ions which carry a positive charge so that the electrodes 23 or 37 must be at a negative potential to attract these ions and detect their presence. Of course, if the gases contained primarily negative ions the electrodes would be maintained at a positive potential but this is generally not the case with jet engine fuels now in use.

In accordance with the present invention, a reference signal proportional to the ion content in a flame produced by the fuel for the jet engine 10 is obtained for comparison with the signal developed across the potentiometer 40 in order to compensate for the aforementioned variations in the fuel components such as salts and other minor impurities. In the form of the invention illustrated in FIGS. 1, 3, 5 and 6 this reference signal is developed by an auxiliary burner and electrode unit indicated generally by the reference numeral 47. As is best shown in FIGS. 5 and 6 the unit 47 comprises an outer casing or shell 48 which is suitably mounted by means of brackets 49 or the like on the exterior of the engine casing 11. Since the unit 47 is mounted at a position adjacent the tailpipe section of the engine where it is exposed to relatively high temperatures, the shell 48 is preferably formed of materials such as titanium and stainless steel alloys which are capable of withstanding these temperatures. The unit 47 is very small so that it occupies little space and is also relatively light in weight. A fuel inlet assembly 50 is provided at one end of the housing 48 to introduce a small sample of the fuel being used by the jet engine 10. This fuel inlet assembly comprises a nozzle 51 threaded into an annular insert 52 which is welded or otherwise secured to the end wall of the housing 48. A portion 51a of the periphery of the nozzle 51 is threaded to permit adjustment of the nozzle position relative to the fixed insert 52. A nut 53 on the threaded portion 51a may be employed to lock the nozzle 51 in position after the adjustment has been completed. An air inlet fitting 54 is threaded into one end of the nozzle 51 to supply inlet air while a fuel inlet fitting 55 is threaded into a bore extending radially of the nozzle to supply the fuel sample. The nozzle 51 is hollow so that a mixture of air and fuel respectively delivered through the fittings 54 and 55 is passed through the nozzle outlet 56 to form a sprayed cone of fuel-air mixture.

An igniter asembly 57 is mounted on the housing 48 at a position adjacent the fuel inlet assembly 50 for the purpose of igniting the sprayed cone of fuel-air mixture in order to produce a flame. The igniter assembly comprises a spark plug 58 threaded into an adapter bushing 59 which is, in turn, threaded into a cylindrical sleeve bushing 60 welded or otherwise secured to a side wall of the housing 48. The adapter bushing 59 may be threaded into or out of the fixedly mounted bushing sleeve 60 in order to permit adjustment of the axial position of the plug 58, thereby to position the spark plug gap properly with respect to the sprayed cone of fuel-air mixture emanating from the nozzle 51. The pilot flame resulting from burning the fuel sample produces ions which are present in an amount dependent upon the makeup of the engine fuel. Thus, if the engine fuel contains potassium or sodium salts or other impurities tending to produce an abnormal amount of ionization the number of ions produced by the pilot flame is correspondingly increased.

In order to detect the concentration of the ions produced by the pilot flame, an electrode array 61 is provided. While the electrode array 61 is illustrated in FIG. 5 as comprising four uniformly spaced electrodes, in actual practice the number of electrodes is selected to compensate for a non-uniform distribution of the flame and, hence, of the collected ions. Thus, if the envelope of the pilot flame is sufficiently stable only one electrode may be used but in other instances the number of electrodes required to provide the necessary ion current may be increased to more than the four shown. The individual electrode assemblies making up the array 61 are identified by the reference numeral 62 and each is identical to the electrode assembly 23 described in detail above and shown in FIG. 4.

If more than one electrode is used, the electrodes of the array are connected electrically in parallel so that the output from the array 61 represents the total ion current from all of the electrodes and is, of course, proportional to the sum of the ion current developed by the individual electrodes. The electrodes 62 are electrically connected through conducting means 63 to a resistor 64 in the thrust indicator 35. The ion current from the array 61 flows through the resistor 64 to develop a reference signal or voltage which is applied via a conductor 65 to a second input terminal 66 of the servo-amplifier 42. Operating potential for the electrodes 62 is applied from the power supply 44 the negative terminal of which is connected to one end of the resistor 64. The amplifier 42 compares the two signals respectively applied to its signal input terminals 41 and 66 and provides an error signal in the event that these input signals are not balanced in amplitude. The error signal is applied via a conductor 67 to the rotor winding of a servo-motor 68 which has its stator windings energized by the 400 cycle potential applied through conductors 69 and 70. The rotor of the servo-motor is mechanically connected, as indicated by the broken line 71, to the wiper 40a of the precision potentiometer 40 and is also connected to drive the indicator or pointer 72 of a thrust meter 73. The drive mechanism 71 includes a gear train and, in addition, a cam mechanism may be provided for effecting linear movement of the pointer or indicator 72 in response to the mechanical movement of the rotor of the servomotor. The pointer 72 overlies a graduated circular scale of the face of the thrust meter to provide a direct indication of thrust produced by the jet engine 10. More specifically, if the two signals respectively applied to the input terminals 41 and 66 of the servo-amplifier 42 are of equal amplitude, no error signal is applied to the servo-motor 68 and the system is balanced. However, if the signal developed at the wiper 40a differs from the reference signal developed across resistor 64 an error signal is applied to drive the servo-motor 68 in a direction to rebalance the system. Thus, if the signal applied to the input terminal 41 of the servo-amplifier is more positive than the signal applied to the input terminal 66, the servo-motor is driven in a direction to move the wiper 40a downwardly as viewed in FIG. 3 until the input signal applied to the terminal 41 becomes exactly equal to that applied to the input terminal 66. Similarly, if the signal applied to the signal input terminal 41 is more negative than the signal applied to the input terminal 66 then the polarity of the error signal applied to the servo-motor 68 is such that the servo-motor is driven in a direction to move the wiper 40a upwardly as viewed in FIG. 3. until the two signals respectively applied to the input terminals 41 and 66 are exactly balanced. The pointer 72 represents the position of the wiper of the resistor 40 and provides a continuous indication of the ion content of the exhaust gases as compared with the reference signal developed by the auxiliary unit 47. The meter 73 thus responds jointly to the ion current produced by the electrode array 22 or 36 and the ion current produced by the electrode array 61 to provide a direct indication of the thrust produced by the jet engine 10 with compensation for any variations caused by differences in the makeup of the fuel being consumed by the engine.

In another embodiment of the invention illustrated in FIG. 7 the reference signal is developed directly by sampling the ions produced by the flame in the combustion chamber 14 of the jet engine and without requiring the use of an auxiliary unit such as the unit 47 shown in FIGS.

1 and 3. In the embodiment shown in FIG. 7 one or more electrodes 74 are mounted on a wall of the combustion chamber with the electrode probes extending into the chamber to sample the flame produced by the combustion of the fuels being consumed. The electrode mounting may be like that shown in FIG. 4 and, if more than one electrode is used, they are electrically connected in parallel and are, in turn, connected to the thrust indicator in the manner illustrated in FIG. 3; that is, they are connected to one end of the resistor 64. An igniter or spark plug unit 75 similar to the igniter 57 described above is provided to initiate burning of the engine fuel in the combustion chamber 14. The electrodes 74 may be similar to the electrodes 23 illustrated in FIG. 4 and, hence, they are not described in detail. In any event, these electrodes respond to the ions produced by the flame in the combustion chamber to produce an ion current flow which is proportional to the total number of ions produced including those arising from the impurities such as potassium and sodium salts in the engine fuel. The ion current flow from the electrodes 74 is utilized by the thrust indicator in a manner which will be apparent in view of the foregoing description.

While several embodiments of the invention have been illustrated and described, it will be recognized that many modifications and changes will readily occur to those skilled in this art and it is, therefore, contemplated by the appended claims to cover any such modifications and changes as fall within the true spirit and scope of the invention.

What is claimed as new and desired to be secured by Letters Patent of the United States is:

1. Apparatus for measuring the thrust produced by a jet engine, said apparatus comprising means for developing a first electrical signal varying as a function of the ion content of exhaust gases from the engine, means for producing a second electrical signal varying as a function of the ions developed by burning fuel consumed by said engine, and means responsive to said first and second electrical signals for providing an indication of the thrust produced by the engine.

2. Apparatus for measuring the thrust produced by a jet engine of the type utilizing a fuel, said apparatus comprising means for developing a first electrical signal varying as a function of the ion content of exhaust gases from the engine, means for burning at least a portion of the engine fuel to produce a flame, means responsive to the ions developed by said flame for producing a second electrical signal varying as a function of variations in the concentration of the latter ions, and means responsive to said first and second electrical signals for providing an indication of the thrust produced by the engine.

3. The apparatus defined by claim 2 wherein the burning means comprises combustion means for said jet engine and wherein the means for producing the second signal includes electrode means adjacent said combustion means.

4. The apparatus defined by claim 2 wherein the burning means comprises a burner housing, means for supplying a sample of the engine fuel to said housing and means for igniting said fuel sample to produce said flame, and wherein the means for producing the second current comprises electrode means mounted on said housing for detecting ions produced by said flame.

5. In a measuring apparatus for use with a jet engine of the type utilizing a fuel, an auxiliary unit, means for supplying a sample of said fuel to said unit, said unit including means for igniting said fuel sample to produce a pilot flame, and said unit also including means responsive to the ions produced by said pilot flame for producing a current varying as a function of the number of said ions present.

6. In a measuring apparatus for use with a jet engine of the type utilizing a fuel, means for burning at least a portion of the fuel to produce a flame, and means responsive to the ions produced by said flame for producing a current varying as a function of variations in the number of said ions caused by fluctuations in the makeup of the fuel.

7. The apparatus defined by claim 6 wherein the burning means comprises combustion means for said jet engine and wherein said current producing means includes electrode means adjacent said combustion means.

8. The apparatus defined by claim 6 wherein the burning means comprises a burner housing, means for supplying a sample of the fuel to said housing and means for igniting said fuel sample to produce said flame, and wherein said current producing means comprises electrode means mounted on said housing for detecting ions produced by said flame.

9. In an apparatus for measuring the thrust developed by a jet engine of the type utilizing a fuel, means for burning at least a portion of the fuel to produce a flame, means responsive to the ions produced by said flame for producing a current varying as a function of variations in the number of said ions caused by fluctuations in the makeup of the fuel, measuring means, means electrically connecting said current producing means and said measuring means, said measuring means including a circuit for producing a first signal in response to said current, means responsive to the exhaust gases of said engine for producing a second signal varying as a function of the ion concentration in said exhauts gases, said measuring means including a circuit for comparing said first and second signals and for developing an error signal in response to any differences in amplitude between the compared signals, and means responsive to said error signal for indicating the thrust produced by the engine.

10. In an apparatus for measuring the thrust developed by a jet engine of the type utilizing a fuel, means for burning at least a portion of the fuel to produce a flame, means responsive to the ions produced by said flame for producing a current varying as a function of variations in the number of said ions caused by fluctuations in the makeup of the fuel, said burning means comprising combustion means for said jet engine, said current producing means including electrode means adjacent said combustion means, measuring means, means electrically connecting said current producing means and said measuring means, said measuring means including a circuit for producing a first signal in response to said current, means responsive to the exhaust gases of said engine for producing a second signal varying as a function of the ion concentration in said exhaust gases, said measuring means including a circuit for comparing said first and second signals and for developing an error signal in response to any differences in amplitude between the compared signals, and means responsive to said error signal for indicating the thrust produced by the engine.

11. In an apparatus for measuring the thrust developed by a jet engine of the type utilizing a fuel, means for burning at least a portion of the fuel to produce a flame, means responsive to the ions produced by said flame for producing a current varying as a function of variations in the number of said ions caused by fluctuations in the makeup of the fuel, said burning means comprising a burner housing, means for supplying a sample of the fuel to said housing, means for igniting said fuel sample to produce said flame, said current producing means comprising electrode means mounted on said housing for detecting ions produced by said flame, measuring means, means electrically connecting said current producing means and said measuring means, said measuring means including a circuit for producing a first signal in response to said current, means responsive to the exhaust gases of said engine for producing a second signal varying as a function of the ion concentration in said exhaust gases, said measuring means including a circuit for comparing said first and second signals and for developing an error signal in response to any differences in amplitude between the compared signals, and means responsive to said error signal for indicating the thrust produced by the engine.

12. Apparatus for measuring the thrust produced by a turbojet engine, said apparatus comprising means for developing a first electrical signal varying as a function of the ion content of exhaust gases from the engine, means for producing a second electrical signal varying as a function of the ions developed by burning fuel consumed by said engine, means for comparing said first and second signals and for developing error signals in response to differences in amplitude between the compared signals, and means responsive to the error signals for providing an indication of the thrust produced by the jet engine.

13. Apparatus for measuring the thrust produced by a turbojet engine of the type utilizing a fuel, said apparatus comprising means for developing a first electrical signal varying as a function of the ion content of exhaust gases from the engine, means for burning at least a portion of the engine fuel to produce a flame, means responsive to the ions developed by said flame for producing a second electrical signal varying as a function of variations in the concentration of the latter ions, means for comparing said first and second signals and for developing error signals in response to differences in amplitude between the compared signals, and means responsive to the error signals for providing an indication of the thrust produced by the jet engine.

14. Apparatus for measuring the thrust produced by a turbojet engine, said apparatus comprising means for developing a first electrical signal varying as a function of the ion content of exhaust gases from the engine, means for producing a second electrical signal varying as a function of the ions developed by burning fuel consumed by said engine, measuring means for providing an indication of the thrust produced by the engine, and means for supplying said first and second electrical signals to said measuring means.

15. Apparatus for measuring the thrust produced by a turbojet engine of the type utilizing a fuel, said apparatus comprising means for developing a first electrical signal varying as a function of the ion content of exhaust gases from the engine, means for burning at least a portion of the engine fuel to produce a flame, means responsive to the ions developed by said flame for producing a second electrical signal varying as a function of variations in the concentration of the latter ions, measuring means for providing an indication of the thrust produced by the engine, and means for supplying said first and second electrical signals to said measuring means.

References Cited
UNITED STATES PATENTS

| | | | |
|---|---|---|---|
| 2,679,162 | 5/1954 | Stuart | 73—194 |
| 3,184,967 | 5/1965 | Rogers | 73—194 |

RICHARD C. QUEISSER, *Primary Examiner.*

JERRY W. MYRACLE, *Assistant Examiner.*